US008768940B2

(12) United States Patent
Alspector et al.

(10) Patent No.: US 8,768,940 B2
(45) Date of Patent: *Jul. 1, 2014

(54) DUPLICATE DOCUMENT DETECTION

(75) Inventors: Joshua Alspector, Chantilly, VA (US); Abdur R. Chowdhury, Oakton, VA (US); Aleksander Kolcz, Fairfax, VA (US)

(73) Assignee: Facebook, Inc., Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/612,840

(22) Filed: Sep. 13, 2012

(65) Prior Publication Data

US 2013/0007026 A1    Jan. 3, 2013

Related U.S. Application Data

(63) Continuation of application No. 13/185,238, filed on Jul. 18, 2011, now Pat. No. 8,429,178, which is a continuation of application No. 12/144,021, filed on Jun. 23, 2008, now Pat. No. 7,984,029, which is a continuation of application No. 11/016,959, filed on Dec. 21, 2004, now Pat. No. 7,392,262.

(60) Provisional application No. 60/580,379, filed on Jun. 18, 2004, provisional application No. 60/562,298, filed on Apr. 15, 2004, provisional application No. 60/543,283, filed on Feb. 11, 2004.

(51) Int. Cl.
*G06F 17/30* (2006.01)

(52) U.S. Cl.
USPC ............................ 707/754; 709/206; 709/207

(58) Field of Classification Search
USPC .................................. 707/754; 709/206, 207
See application file for complete search history.

(56) References Cited

U.S. PATENT DOCUMENTS

| 5,463,773 | A | 10/1995 | Sakakibara et al. |
| 5,619,709 | A | 4/1997 | Caid et al. |
| 5,675,710 | A | 10/1997 | Lewis |
| 6,621,930 | B1 | 9/2003 | Smadja |
| 6,658,423 | B1 | 12/2003 | Pugh et al. |
| 7,047,242 | B1 * | 5/2006 | Ponte ..................................... 1/1 |
| 7,139,756 | B2 | 11/2006 | Cooper et al. |
| 7,392,262 | B1 | 6/2008 | Alspector et al. |
| 7,568,148 | B1 * | 7/2009 | Bharat et al. .................. 715/200 |
| 7,624,274 | B1 | 11/2009 | Alspector et al. |
| 7,725,475 | B1 | 5/2010 | Alspector et al. |
| 7,984,029 | B2 | 7/2011 | Alspector et al. |

(Continued)

OTHER PUBLICATIONS

Androutsopoulos et al., An Evaluation of Naïve Bayesian Anti-Spam Filtering, Proceedings of the Workshop on Machine Learning in the New Information Age: 11th European Conference on Machine Learning (ECML 2000), G. Potamias, V. Moustakis, and M. van Someren, eds., 2000, pp. 9-17.

(Continued)

*Primary Examiner* — Cindy Nguyen
(74) *Attorney, Agent, or Firm* — Keller Jolley Preece

(57) ABSTRACT

In a single-signature duplicate document system, a secondary set of attributes is used in addition to a primary set of attributes so as to improve the precision of the system. When the projection of a document onto the primary set of attributes is below a threshold, then a secondary set of attributes is used to supplement the primary lexicon so that the projection is above the threshold.

20 Claims, 8 Drawing Sheets

(56) References Cited

U.S. PATENT DOCUMENTS

| | | | |
|---|---|---|---|
| 8,429,178 B2 | 4/2013 | Alspector et al. | |
| 2002/0103809 A1* | 8/2002 | Starzl et al. | 707/102 |
| 2003/0046297 A1 | 3/2003 | Mason | |
| 2003/0221166 A1 | 11/2003 | Farahat et al. | |
| 2003/0225763 A1 | 12/2003 | Guilak et al. | |
| 2005/0050150 A1* | 3/2005 | Dinkin | 709/207 |
| 2005/0060643 A1 | 3/2005 | Glass et al. | |
| 2005/0086224 A1 | 4/2005 | Franciosa et al. | |
| 2005/0091319 A1 | 4/2005 | Kirsch | |
| 2006/0294077 A1 | 12/2006 | Bluhm | |
| 2013/0173518 A1 | 7/2013 | Alspector et al. | |
| 2013/0173562 A1 | 7/2013 | Alspector et al. | |
| 2013/0173563 A1 | 7/2013 | Alspector et al. | |

OTHER PUBLICATIONS

Bilenko et al., Learning to Combine Trained Distance Metrics For Duplicate Detection in Databases, Tech. Rep. AI 02-296, Artificial Intelligence Lab, University of Texas at Austin, 2002, pp. 1-19.

Breiman, Bagging Predictors, Machine Learning, 24 (1996), pp. 123-140.

Brin et al., Copy Detection Mechanisms for Digital Documents. Proceeding of Sigmod, 1995, pp. 398-409.

Broder, On the Resemblance and Containment of Documents, SEQS: Sequences '97, 1998, pp. 21-29.

Broder et al., Syntactic Clustering of the Web, Computer Networks and ISDN Systems 29, 1997, pp. 1157-1166.

Buckley et al., The Smart/Empire Tipster IR System, Proceedings—Tipster Text Program Phase III, 2000, pp. 107-121.

Chowdhury et al., Collection Statistics for Fast Duplicate Document Detection, ACM Transactions on Information Systems, 20 (2002), pp. 171-191.

Cooper et al., A Novel Method for Detecting Similar Documents, Proceedings of the 35th, Hawaii International Conference on System Sciences, 2002.

Graham-Cummings, The Spammers' Compendium. Proceedings of the Spam Conference, Jan. 17, 2003, pp. 1-17.

Gionis et al., Similarity Search in High Dimensions via Hashing, Proceedings of the 25th International Conference of Very Large Databases (VLDB), 1999, pp. 518-529.

Fetterly et al., On the Evolution of Clusters of Near-Duplicate Web Pages, Proceedings of the First Latin American Web Congress, 2003, pp. 37-45.

Fawcett, "In Vivo" Spam Filtering: A Challenge Problem for KDD, SIGKDD Explorations, vol. 5, Issue 2, (2003), pp. 140-148.

Drucker at al., Support Vector Machines for Spam Categorization: IEEE Transactions on Neural Networks, vol. 10, No. 5, Sep. 1999, pp. 1048-1054.

Hall, A Countermeasure to Duplicate-Detecting Anti-Spam Techniques, At&T Labs Technical Report 99.9.1, At&T Corp., 1999, pp. 1-26.

Haveliwala at al., Scalable Techniques for Clustering the Web, Proceedings of WebDB 2000, 2000.

Heintze, Scalable Document Fngerprinting, The USENIX Association, Proceedings of the Second USENIX Workshop on Electronic Commerce, Nov. 1996, pp. 191-200.

Hernandez, et al., The Merge/Purge Problem for Large Databases, Proceedings of the Sigmod Conference, 1995, pp. 127-138.

Hoad et al., Methods for Identifying, Versioned and Plagiarised Documents, Journal of the American Society for Information Science and Technology, 2002, pp. 203-215.

Ilyinsky et al., An Efficient Method to Detect Duplicates of Web Documents with the Use of Inverted Index, Proceedings of the Eleventh International World Wide Web Conference, 2002.

Kleinberg, Bursty and Hierarchical Structure in Streams, Proceedings of the Eighth ACM SIGKDD International Conference on Knowledge Discovery and Data Mining (KDD-2002), 2002, pp. 1-25.

Kolcz at al., Data Duplication: An Imbalance Problem?, Proceedings of the ICML '2003 Workshop on Learning from Imbalanced Datasets (11), 2003.

Kolcz et al., SVM-Based Filtering of E-Mail Spam with Content-Specific Misclassification Costs, Proceedings of the Workshop on Text Mining (TextDM'2001), 2001, pp. 1-14.

Kwok, A New Method Weighting Query Terms for Ad-Hoc Retrieval, Computer Science Department, Queens College, City University of New York, Flushing NY, 1996.

McCallum et al., Efficient Clustering of High Dimensional Data Sets with Application to Reference Matching, Proceedings of Sixth ACM SIGKDD International Conference on Knowledge Discovery and Data Mining (KDD-2000), 2000.

Robertson at al., Okaipi at Trec-7: Automatic Ad-Hoc, Filtering, VLC and Interactive, Proceedings of the 7th Text Retrieval Conference, 1998, pp. 253-264.

Sahami et al., A Bayesian Approach to Filtering Junk E-mail, Proceedings of the AAAI-98 Workshop on Learning for Text Categorization, 1998.

Salton et al., A Vector-Space Model for Information Retrieval, Communications of the ACM, vol. 18, No. 11, Nov. 1975, 613-620.

Sanderson et al., Duplicate Detection in, The Reuters Collection, Tech. Rep. TR-1997-5, Department of Computing Science, University of Glasgow, 1997, pp. 11.

Shivakumar et al., Finding Near-Replicas of Documents on the Web, WebDB: International Workshop on the World Wide Web and Databases, WebDB, LNCS, 1999.

Singhal et al., Pivoted Document Length Normalization, Proceedings of the Nineteenth Annual International ACM SIGIR Conference on Research and Development in Information Retrieval, 1996.

Winkler et al., The State of Record Linkage and Current Research Problems, Tech. Rep., Statistical Research Division, U.S. Bureau of Census, Washington DC, 1999.

Androutsopoulos et al., Learning to Filter Unsolicited Commercial E-Mail. Technical Report 2004/2, NCSR Demokritos, 2004, pp. 1-52.

Baker et al., Distribution Clustering of Words for Text Classification. Proceedings of SIGIR-98, 21st ACM International Conference on Research and Development in Information Retrieval, 1998, pp. 96-103.

Carreras et al, Boosting Trees for Anti-Spam Email Filtering, Proceedings of RANLP-01, 4th International Conference on Recent Advances in Natural Language Processing, Tzigov Chark, BG, 2001.

Slonim et al., The Power of Word Clusters for Text Clasification, 23rd European Colloquium on Information Retrieval Research, 2001, pp. 1-12.

Yerazunis, Sparse Binary Polynomial Hashing and the CRM114 Discriminator, MIT Spam Conference, 2003.

Zhou et al., Approximate Object Location and Spam Filtering on Peer-to-Peer Systems, Proceedings of ACM/IFIP/USENIX International Middleware Conference (Middleware 2003), 2003, pp. 1-20.

Conrad et al., "Online Duplicate Document Detection Signature Reliability in a Dynamic Retrieval Environment", Copyright 2003 ACM.

U.S. Appl. No. 11/016,928, Mail Date Sep. 2, 2008, Office Action.
U.S. Appl. No. 11/016,928, Mail Date Mar. 19, 2009, Office Action.
U.S. Appl. No. 11/016,928, Mail Date Jul. 13, 2009, Notice of Allowance.
U.S. Appl. No. 11/016,930, Mail Date May 24, 2007, Office Action.
U.S. Appl. No. 11/016,930, Mail Date Dec. 11, 2007, Office Action.
U.S. Appl. No. 11/016,930, Mail Date Feb. 22, 2008, Office Action.
U.S. Appl. No. 11/016,930, Mail Date Sep. 26, 2008, Office Action.
U.S. Appl. No. 11/016,930, Mail Date Apr. 7, 2009, Office Action.
U.S. Appl. No. 11/016,930, Mail Date Jan. 12, 2010, Notice of Allowance.
U.S. Appl. No. 11/016,959, Mail Date May 31, 2007, Office Action.
U.S. Appl. No. 11/016,959, Mail Date Dec. 13, 2007, Notice of Allowance.
U.S. Appl. No. 12/144,021, Mail Date Oct. 26, 2010, Office Action.
U.S. Appl. No. 12/144,021, Mail Date Mar. 17, 2011, Notice of Allowance.
U.S. Appl. No. 12/780,500, Mail Date Nov. 22, 2010, Office Action.
U.S. Appl. No. 12/780,500, Mail Date May 11, 2011, Office Action.

(56) References Cited

OTHER PUBLICATIONS

U.S. Appl. No. 12/780,500, Mail Date Oct. 9, 2013, Notice of Allowance.
U.S. Appl. No. 13/185,238, Mail Date Mar. 29, 2012, Office Action.
U.S. Appl. No. 13/185,238, Mail Date Oct. 17, 2012, Notice of Allowance.
U.S. Appl. No. 13/185,238, Feb. 4, 2013, Notice of Allowance.
U.S. Appl. No. 12/780,500, filed May 14, 2010, Alspector.
U.S. Appl. No. 13/620,913, Apr. 24, 2014, Office Action.

* cited by examiner

DUPLICATE DOCUMENT DETECTION

CLAIM OF PRIORITY

The present application is a continuation of U.S. patent application Ser. No. 13/185,238, filed on Jul. 18, 2011, which is a continuation of U.S. patent application Ser. No. 12/144,021, filed Jun. 23, 2008 now issued as U.S. Pat. No. 7,984,029, which is a continuation of U.S. patent application Ser. No. 11/016,959, filed on Dec. 21, 2004 now issued as U.S. Pat. No. 7,392,262, which claims the benefit and priority to U.S. provisional patent application No. 60/580,379, filed Jun. 18, 2004, U.S. provisional patent application No. 60/562,298, filed Apr. 15, 2004, and U.S. provisional application No. 60/543,283, filed Feb. 11, 2004. Each of the aforementioned patent(s), and applications(s) are hereby incorporated by reference in their entirety.

TECHNICAL FIELD

This description relates to duplicate detection and spam filtering.

BACKGROUND

With the advent of the Internet and a decline in computer prices, many people are communicating with one another through computers interconnected by networks. A number of different communication mediums have been developed to facilitate such communications between computer users. One type of prolific communication medium is electronic mail (e-mail).

Unfortunately, because the costs of sending e-mail are relatively low, e-mail recipients are being subjected to mass, unsolicited, commercial e-mailings (colloquially known as e-mail spam or spam e-mails). These are akin to junk mail sent through the postal service. However, because spam e-mail requires neither paper nor postage, the costs incurred by the sender of spam e-mail are quite low when compared to the costs incurred by conventional junk mail senders. Due to this and other factors, e-mail users now receive a significant amount of spam e-mail on a daily basis. Spam e-mail impacts both e-mail users and e-mail providers. For e-mail users, spam e-mail can be disruptive, annoying, and time consuming. For an e-mail service provider, spam e-mail represents tangible costs in terms of storage and bandwidth usage. These costs may be substantial when large numbers of spam e-mails are sent.

SUMMARY

In general, when detecting a duplicate document, a primary lexicon of attributes and a secondary lexicon of attributes are generated and unique attributes in a document are determined. An intersection between the unique attributes in the document and the primary lexicon is also determined. When the intersection does not exceed a threshold, attributes from the secondary lexicon that intersect with the unique attributes in the document are added to the intersection to create an augmented intersection that exceeds the threshold. A signature for the document is calculated based on the augmented intersection.

Implementations may include one or more of the following features. For example, the threshold may be a minimum number of attributes or a minimum percentage of the unique attributes in the document. The document may be an e-mail and the unique attributes may include tokens, where the tokens include words in a body of the e-mail. The attributes in the primary lexicon, the attributes in the secondary lexicon, or the unique attributes may include words.

The document may be an unknown document and the signature may be a query signature. The query signature may be compared to known signatures generated from a set of known documents to determine whether the unknown document is a duplicate of one of the set of known documents.

A signature for the document may be calculated based on the intersection when the intersection exceeds the threshold.

To generate the primary and secondary lexicons, a set of documents may be parsed to obtain unique attributes in the set of documents. The normalized inverse document frequency for the unique attributes in the set of documents may be calculated. The primary lexicon may be defined as the unique attributes in the set of documents that have a normalized inverse document frequency within a selected range, while the secondary lexicon may be defined as the unique attributes in the set of documents that have a normalized inverse document frequency outside the selected range, such as, for example, above the selected range. The set of documents may be a set of known spam e-mails or a set of training documents.

To determine the intersection between the unique attributes in the document and the primary lexicon, an intersection may be determined between the unique attributes in the document and the unique attributes in the set of documents to obtain a set of common attributes. A normalized inverse document frequency for the common attributes from the unique attributes in the set of documents may be obtained and the common attributes may be ranked according to the normalized inverse document frequency of the common attributes. The common attributes that have a normalized inverse document frequency within the selected range may be selected to obtain a set of intersection attributes.

To determine whether the intersection exceeds a threshold comprises, a threshold percentage may be multiplied times a number of the unique attributes in the document to obtain a preliminary threshold number. The preliminary threshold number may be compared to a specified threshold number to determine whether the preliminary threshold number exceeds the specified threshold number. A number of attributes in the set of intersection attributes may be compared to the preliminary threshold number when the preliminary threshold number exceeds the specified threshold number. A number of attributes in the set of intersection attributes may be compared to the specified threshold number when the preliminary threshold number does not exceed the specified threshold number.

To add attributes from the secondary lexicon that intersect with the unique attributes in the document to the intersection to create an augmented intersection that exceeds the threshold, an additional number of attributes needed to achieve the threshold may be determined and additional attributes may be selected equal to the additional number of attributes from the set of common attributes that have a normalized inverse document frequency outside of the specified range. The selected attributes may be added to the set of intersection attributes. The selected attributes may be attributes that have a normalized inverse document frequency above the specified range in an increasing order of the normalized document frequency of the additional attributes.

Implementations of the described techniques may include hardware, a method or process, or computer software on a computer-accessible medium.

DETAILED DESCRIPTION

In a single-signature duplicate document system, a secondary set of attributes is used in addition to a primary set of attributes so as to improve the precision of the system. Generally, in single-signature, or single-fingerprint, based duplicate detection systems, two documents are considered identical if their projections onto a lexicon of attributes are the same (where the attributes are typically those that have characteristics useful for identifying a given document). To determine whether the projections are the same, the projection of each document is normally mapped to a single signature, and when two documents' signatures match, they are considered to be duplicates.

Single-signature techniques, however, may provide false positives when the projection of a document onto the lexicon of attributes is small, thereby decreasing the precision of the technique. To mitigate the decrease in precision, when the projection of the document on the lexicon of attributes is below a threshold, then a secondary lexicon of attributes is used to supplement the primary lexicon so that the projection is above the threshold.

Such duplicate detection techniques are described below as applied to e-mail spam filtering. However, the techniques may be used for spam filtering in other messaging media, including both text and non-text media. For example, spam may be sent using instant messaging or short message service (SMS), or may appear on Usenet groups. Similarly, the techniques may be applied, for instance, to filter spam sent in the form of images, sounds, or video when an appropriate set of attributes is selected.

Moreover, the techniques described may be applied to duplicate detection problems other than spam filtering. For example, duplicate detection of documents is also useful in Internet search engines and newsfeed applications. For Internet search engines, duplicate detection may be used to eliminate duplicate documents stored as part of the search engine database, or to eliminate duplicate documents from being returned to the user as part of the search results. For newsfeed applications, duplicate detection may be used to insure only one copy of a story is being fed to the user.

More generally, the described techniques may be applied to text or non-text items in a variety of document duplication applications. Therefore, the term "document" should be understood to generally refer to a computer file that contains data for use by applications, such as, for example, a file that contains text, images, sounds, video, other media, or a combination thereof. Accordingly, while described below as being text, the attributes may be text or non-text attributes such that the lexicons of attributes or unique attributes in a document may include both text and non-text attributes, only text attributes, or only non-text attributes.

Figure 1:
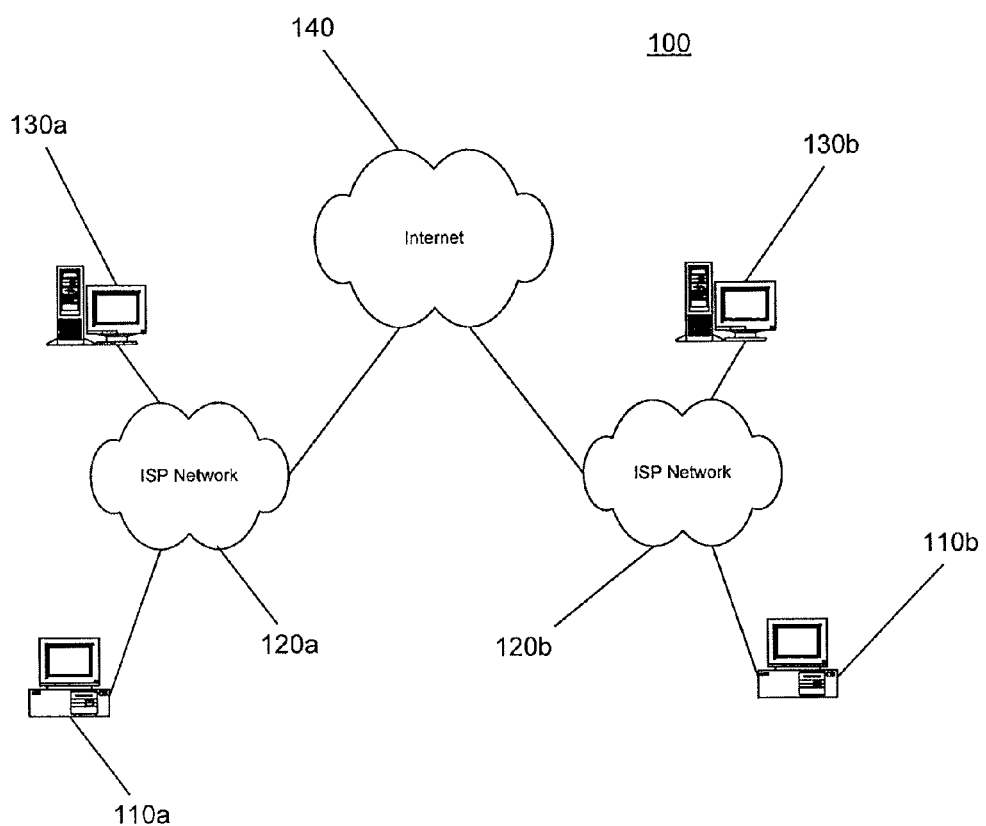
FIG. 1 is a block diagram of an exemplary networked computing environment that supports e-mail communications and in which spam filtering may be performed.

FIG. 1 illustrates an exemplary networked computing environment 100 that supports e-mail communications and in which spam filtering may be performed. Computer users are distributed geographically and communicate using client systems 110a and 110b. Client systems 110a and 110b are connected to ISP networks 120a and 120b, respectively. While illustrated as ISP networks, networks 120a or 120b may be any network, e.g. a corporate network. Clients 110a and 110b may be connected to the respective ISP networks 120a and 120b through various communication channels such as a modem connected to a telephone line (using, for example, serial line internet protocol (SLIP) or point-to-point protocol (PPP)) or a direct network connection (using, for example, transmission control protocol/internet protocol (TCP/IP)). E-mail or other messaging servers 130a and 130b also are connected to ISP networks 120a and 120b, respectively. ISP networks 120a and 120b are connected to a global network 140 (e.g., the Internet) such that a device on one ISP network can communicate with a device on the other ISP network. For simplicity, only two ISP networks 120a and 120b have been illustrated as connected to Internet 140. However, there may be a large number of such ISP networks connected to Internet 140. Likewise, many e-mail servers and many client systems may be connected to each ISP network.

Each of the client systems 110a and 110b and e-mail servers 130a and 130b may be implemented using, for example, a general-purpose computer capable of responding to and executing instructions in a defined manner, a personal computer, a special-purpose computer, a workstation, a server, a device such as a personal digital assistant (PDA), a component, or other equipment or some combination thereof capable of responding to and executing instructions. Client systems 110a and 110b and e-mail servers 130a and 130b may receive instructions from, for example, a software application, a program, a piece of code, a device, a computer, a computer system, or a combination thereof, which independently or collectively direct operations. These instructions may take the form of one or more communications programs that facilitate communications between the users of client systems 110a and 110b. Such communications programs may include, for example, e-mail programs, IM programs, file transfer protocol (FTP) programs, or voice-over-IP (VoIP) programs. The instructions may be embodied permanently or temporarily in any type of machine, component, equipment, storage medium, or propagated signal that is capable of being delivered to a client system 110a and 110b or the e-mail servers 130a and 130b.

Each of client systems 110a and 110b and e-mail servers 130a and 130b includes a communications interface (not shown) used by the communications programs to send communications. The communications may include e-mail, audio data, video data, general binary data, or text data (e.g., data encoded in American Standard Code for Information Interchange (ASCII) format or Unicode).

Examples of ISP networks 120a and 120b include Wide Area Networks (WANs), Local Area Networks (LANs), analog or digital wired and wireless telephone networks (e.g., a Public Switched Telephone Network (PSTN), an Integrated Services Digital Network (ISDN), or a Digital Subscriber Line (xDSL)), or any other wired or wireless network including, e.g., a corporate LAN of WAN. Networks 120a and 120b may include multiple networks or subnetworks, each of which may include, for example, a wired or wireless data pathway.

Each of e-mail servers 130a and 130b may handle e-mail for users connected to ISP network 110a or 110b. Each e-mail server may handle e-mail for a single e-mail domain (e.g., aol.com), for a portion of a domain, or for multiple e-mail domains. While not shown, there may be multiple, interconnected e-mail servers working together to provide e-mail service.

An e-mail user, such as a user of client system 110a or 110b, typically has one or more e-mail mailboxes on an e-mail system, which may incorporate e-mail server 130a or 130b. Each mailbox corresponds to an e-mail address. Each mailbox may have one or more folders in which e-mail is stored. E-mail sent to one of the e-mail user's e-mail addresses is routed to the corresponding e-mail server 130a or 130b and placed in the mailbox that corresponds to the e-mail address to which the e-mail was sent. The e-mail user then uses, for example, an e-mail client program executing on client system 110a or 110b to retrieve the e-mail from e-mail server 130a or 130b and view the e-mail.

The e-mail client programs executing on client systems 110a and 110b also may allow one of the users to send e-mail to an e-mail address. For example, the e-mail client program executing on client system 110a may allow the e-mail user of client system 110a (the sending user) to compose an e-mail message and address the message to a recipient address, such as an e-mail address of the user of client system 110b. When the sender indicates the e-mail is to be sent to the recipient address, the e-mail client program executing on client system 110a communicates with e-mail server 130a to handle the sending of the e-mail to the recipient address. For an e-mail addressed to an e-mail user of client system 110b, for example, e-mail server 130a sends the e-mail to e-mail server 130b. E-mail server 130b receives the e-mail and places it in the mailbox that corresponds to the recipient address. The user of client system 110b may then retrieve the e-mail from e-mail server 130b, as described above.

In an e-mail environment such as that shown, a spammer typically uses an e-mail client or server program to send similar spam e-mails to hundreds, if not millions, of e-mail recipients. For example, a spammer may target hundreds of recipient e-mail addresses serviced by e-mail server 130b on ISP network 120b. The spammer may maintain the list of targeted recipient addresses as a distribution list. The spammer may use the e-mail program to compose a spam e-mail and instruct the e-mail program to use the distribution list to send the spam e-mail to the recipient addresses. The e-mail is then sent to e-mail server 130b for delivery to the recipient addresses. Thus, in addition to receiving legitimate e-mails, e-mail server 130b also may receive large quantities of spam e-mail, particularly when many hundreds of spammers target e-mail addresses serviced by e-mail server 130b.

Thus, e-mail systems tend to be used by any given spammer to send large numbers of substantially similar, although non-identical, e-mails. While the content of each spam e-mail contains essentially the same message, the content of each e-mail is normally varied to a degree. For example, mass e-mailings are often personalized by including the recipient user's first/last name or other personal information. Spammers also may add random text to their e-mails so as to foil some spam detection schemes, such as those based on matching exact textual strings in the e-mail. Usually, the core message of the e-mail remains the same, with random or neutral text added to confuse such "exact-match" spam filters. Often the extra text is inserted in such a way that it is not immediately visible to the users (e.g., when the font has the same color as the background). Other randomization strategies of spammers include: appending random character strings to the subject line of the e-mail, changing the order of paragraphs, or randomizing the non-alphanumeric content.

Furthermore, spammers also may change the words used in the e-mail to convey their message. However, because spam e-mails are typically oriented around the same topics (e.g., pornography), the expressiveness of their content is limited. Thus, even though spammers may attempt to randomize the content of their e-mails, the limitation on the expressiveness of their content results in essentially the same e-mail being sent out, even though the e-mails are not exactly identical.

Consequently, duplicate detection systems that identify nearly identical documents may be useful to filter spam e-mails, either when they enter an e-mail system or later on in the e-mail system (e.g., at the recipient's client system). Identification of spam e-mails at the entry point of an e-mail system may be particularly desirable from the e-mail service provider's perspective, as detection at that point may allow the e-mail service provider to prevent the propagation of such e-mails through the system, thereby reducing the waste of computation and storage resources on unsolicited messages.

Figure 2:
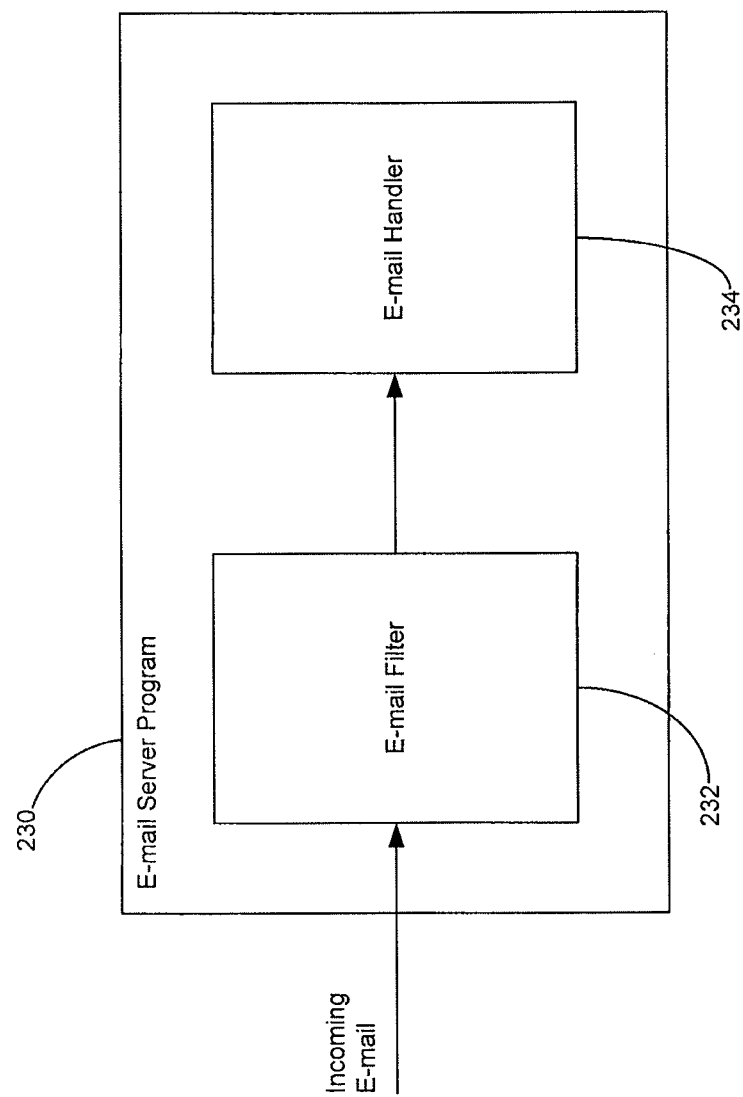
FIG. 2 is a high-level functional block diagram of an e-mail server program that may execute on an e-mail server to provide large-scale spam filtering.

Referring to FIG. 2, to provide spam filtering by duplicate detection at the entry point of an e-mail system, an e-mail server program 230 may execute on an e-mail system (which may incorporate e-mail server 130a or 130b). E-mail server program 230 includes an e-mail filter 232 and a mail handler 234. During operation, the incoming e-mail arriving at e-mail server program 230 is passed to e-mail filter 232. E-mail filter 232 applies duplicate detection techniques to the e-mail to determine whether the e-mail is a spam e-mail or a legitimate e-mail (i.e., not a spam e-mail) and forwards the e-mail to mail handler 234, along with an indication of whether the e-mail is spam or not.

Mail handler 234 then handles the e-mail in a manner that depends on the policies set by the e-mail service provider. For example, mail handler 234 may delete e-mails indicated as spam, while delivering e-mails marked as legitimate to an "inbox" folder of the corresponding e-mail account. Alternatively, e-mail labeled as spam may be delivered to a "spam" folder instead of being deleted.

Figure 3:
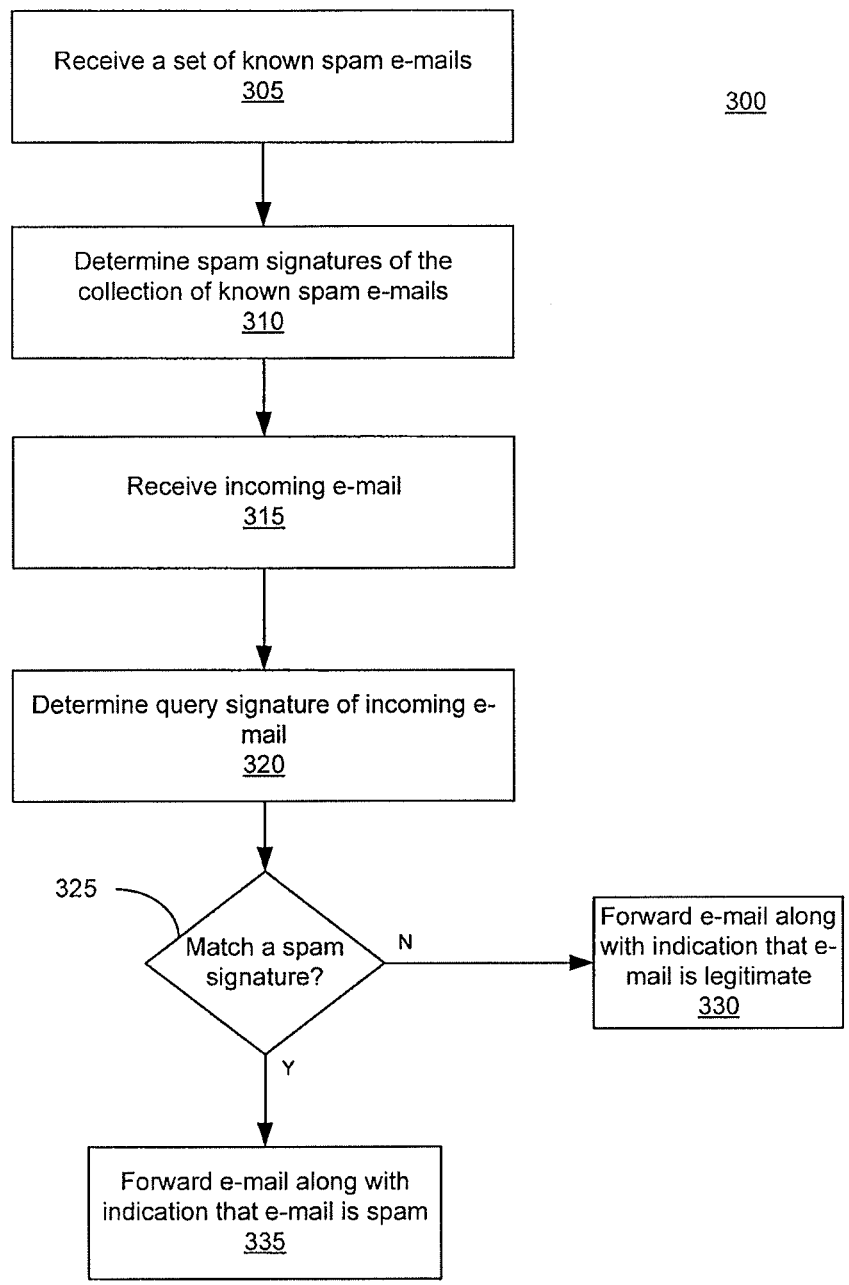
FIG. 3 is a flowchart of a process that may be employed by an e-mail filter to apply a single-signature-based duplicate detection technique to identify spam e-mails.

Referring to FIG. 3, a process 300 may be employed by e-mail filter 232 to apply a single-signature-based duplicate detection technique to identify spam e-mails. In single-signature, or single-fingerprint, based duplicate detection systems, two documents are considered to be the same if their projections onto a lexicon of attributes are the same (where the attributes are typically those that have characteristics useful for identifying a given document). To determine whether the projections are the same, the projection of each document is normally mapped to a single signature, and when two documents' signatures match, they are considered to be duplicates.

For example, in the I-Match approach described by Chowdhury et al. in "Collection Statistics For Fast Duplicate Document Detection," *ACM Transactions on Information Systems*, 20(2):171-191, 2002 [hereinafter Chowdhury], two documents are considered to be the same if the projection of the unique words in the documents onto a lexicon of words is the same. To that end, a lexicon of words is developed, where the words chosen are those that have characteristics useful for specifically identifying a given document. More particularly, in I-Match, the lexicon is developed by examining a collection of documents and selecting the words in the collection that have a mid-range inverse document frequency (idf) or normalized inverse document frequency (nidf) (described more fully below).

For a given document, the set of unique words (i.e., each different word) in the document is identified. For example, if the word "cabin" is used in a document multiple times, it is listed once in the set of unique words. The intersection between the set of unique words and the lexicon is obtained (i.e., the words that are in both the lexicon and the set of unique words are identified). This intersection is then mapped to a single hash value using a hash algorithm such as the Secure Hash Algorithm 1 (SHA1) developed by the National Institute of Standards and Technology (described in Chowdhury and in RFC 3174, available at http://www.faqs.org/rfcs/rfc3174.html). If the hash value matches the hash value of another document, then the two documents are considered to be duplicates of one another.

Using such techniques, after a collection of known spam e-mails has been obtained, the signatures of the known spam e-mails may be calculated and then used to determine if new e-mails are duplicates of the known spam e-mails, and hence, are spam e-mails themselves. Accordingly, in process 300, a set of known spam e-mails is received by e-mail filter 232 (305).

The set of known spam e-mails may be collected in a number of ways. For example, "honeypot" e-mail accounts may be used to collect spam e-mails. A honeypot e-mail account is one set up by an e-mail service provider that does not belong to a legitimate user. The address of the honeypot account is then made available, for example, on websites, usenet groups, or other places where a spammer can obtain the address. Because a honeypot account does not belong to a legitimate user, it should not receive any legitimate e-mails; rather the e-mails received by that account should be spam e-mails. Another manner of collecting spam e-mails may include direct user feedback. To obtain direct user feedback, an e-mail service provider may implement tools or communication channels that allow its users to report spam e-mails that are received. This may be effective because at least some users may be eager to report and/or complain about received spam e-mails. Once a collection of spam e-mails is obtained, human analysts, for example, may review the e-mails to eliminate e-mails that are an exact duplicate of another e-mail in the set. The analysts also may eliminate e-mails that have the exact same message as another e-mail in the set (even though non-message randomization techniques have been applied to make the e-mails non-exact duplicates). The set of known spam e-mails is then provided to e-mail filter 232.

E-mail filter 232 then applies signature-based duplicate detection techniques to obtain a signature (a "spam signature") for each e-mail in the set of known spam e-mails (310). When the e-mail filter 232 subsequently receives an incoming e-mail (315), e-mail filter 232 applies the duplicate detection techniques to the incoming e-mail to obtain a single signature of the e-mail (a "query signature") (320). E-mail filter 232 then compares the query signature to the spam signatures to determine if the query signature matches one of the spam signatures (325). If the query signature does not match a spam signature (325), then e-mail filter 232 forwards the incoming e-mail to e-mail handler 234 with an indication that the incoming e-mail is legitimate. On the other hand, if the query signature does match a spam signature (325), then the incoming e-mail is forwarded to the mail handler 234 with an indication that the e-mail is spam. E-mail handler 234 then handles the incoming e-mail accordingly.

Single-signature techniques, such as I-Match, however, may provide false positives when the projection of a document onto the attributes is small, thereby decreasing the precision of the technique. For example, in the I-Match approach, when the intersection between the set of unique words in a document and the lexicon of words is small, the words used to generate the signature may only be a small portion of the document and, therefore, not very representative of the document. This may result, for instance, in a long document that has the same or nearly the same intersection as a different, smaller document, and, consequently, the I-Match approach may indicate that the longer document is the same as the smaller document, even if this is not the case. In other words, in the I-Match approach, for example, the signature of a document is defined as a hashed representation of the intersection $S=(L \cap U)$ (where L is the lexicon and U is the unique words in a document) and this signature becomes unreliable when $$\frac{|S|}{|U|}$$

becomes too small.

To mitigate such effects in single-signature techniques, a secondary lexicon of attributes (which may be less effective in identifying a given document) may be used to supplement the primary lexicon of attributes when the projection of the document onto the primary lexicon of attributes is below a certain threshold.

Figure 4:
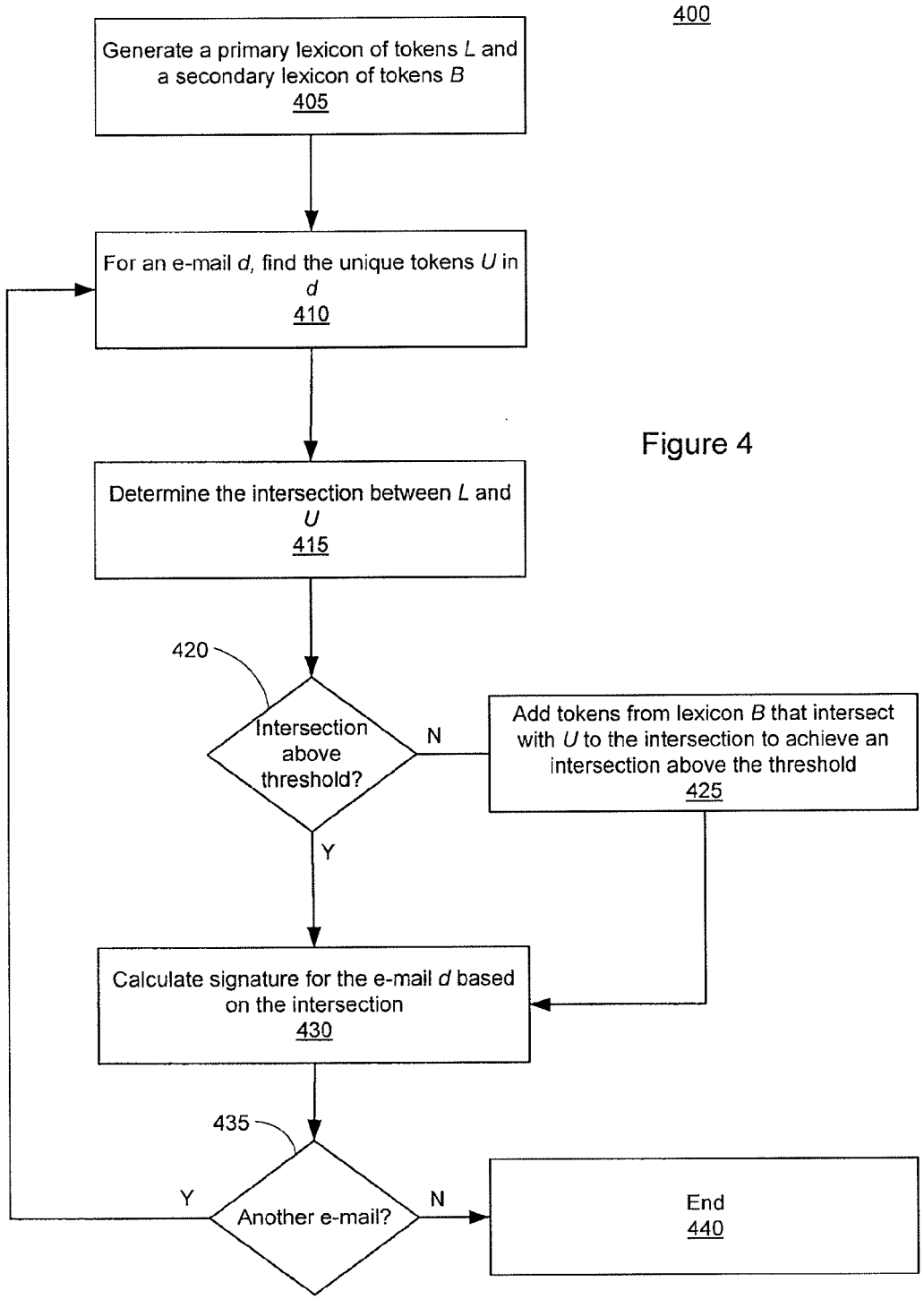
FIG. 4 is a flowchart of a process that may be used to implement actions 310 and 320 in FIG. 3 and which employs a secondary lexicon of attributes to increase the reliability or precision of single-signature duplicate detection techniques.

Referring to FIG. 4, e-mail filter 232 may implement actions 310 and 320 by using a process 400, which employs a secondary lexicon of attributes to mitigate the above described effects in single-signature techniques so as to increase the reliability or precision of such techniques. The attributes may be, e.g., words, phrases or other clusters of words, HTML tags or other features contained in the body of an e-mail. A word may be defined as a set of alphanumeric characters delimited by whitespace. Additionally, the attributes may be tokenized.

A primary lexicon of tokens L and a secondary lexicon of tokens B are generated (405). The primary lexicon L contains tokens that have characteristics useful for specifically identifying a given document. The secondary lexicon B also has tokens that have characteristics useful for specifically identifying a given document, but the tokens in the secondary lexicon B may be ones that have characteristics that are not as useful as those in the primary lexicon L. For example, the primary lexicon L can be created by analyzing a set of documents to identify by some measure, such as the idf or nidf (described below), those tokens that are most useful in identifying a document and selecting those tokens as the primary lexicon L. The secondary lexicon B then may be created by selecting some or all of the remaining tokens that were in the documents.

For a given e-mail d, e-mail filter 232 then determines the unique tokens U in e-mail d (410). When action 310 is implemented by process 400, e-mail d is one of the e-mails in the set of known spam e-mails. On the other hand, when action 320 is implemented by process 400, e-mail d is the incoming e-mail. To determine the unique tokens U, e-mail filter 232 may, for example, parse the body of e-mail d to tokenize the contents of the body and retain a given token if that token has not been encountered before in the body of e-mail d. In some implementations, e-mail filter 232 may only retain attributes that meet certain criteria (e.g., is at least four characters long or has only one digit) and may apply a common formatting to the attributes (e.g., change all letters to lower case).

Next, e-mail filter 232 determines the intersection between unique tokens U and the primary lexicon L (i.e., e-mail filter 232 determines which tokens in U are also in the primary lexicon L) (415). The intersection is then evaluated to determine if it is above a certain threshold (420). The threshold may be, for example, a minimum number of tokens that is common between the unique tokens U and the primary lexicon L and/or a minimum proportion of common tokens to the tokens contained in U. The value of the threshold is generally a matter of design and may be chosen by the system designers through trial and error, with the threshold selected to obtain a target precision of the system.

If the intersection is below the threshold (425), then tokens from secondary lexicon B that also intersect with the unique tokens U are included in the intersection to achieve an intersection above the threshold. This augmented intersection is then used to calculate the signature for e-mail d (420) by applying an algorithm that generates a single signature to the augmented intersection. On the other hand, if the original intersection is above the threshold, then the original intersection is used to calculate the signature for e-mail d (430) by applying an algorithm that generates a single signature to the original intersection.

If there is another e-mail in the set of known spam e-mails or another incoming e-mail (depending on whether process 400 is implementing action 310 or 320), then process 400 moves to action 410 to find the unique tokens in the other e-mail and the process continues as described above. Otherwise, process 400 is ended and the signature for e-mail d is then stored for future use as a spam signature or compared to a spam signature as a query signature (depending on whether process 400 is implementing action 310 or 320) (440).

FIGS. 5-8 illustrate exemplary implementations of actions 405, 415, 420 and 425, respectively, for an implementation of process 400 based on the I-Match approach.

Figure 5:
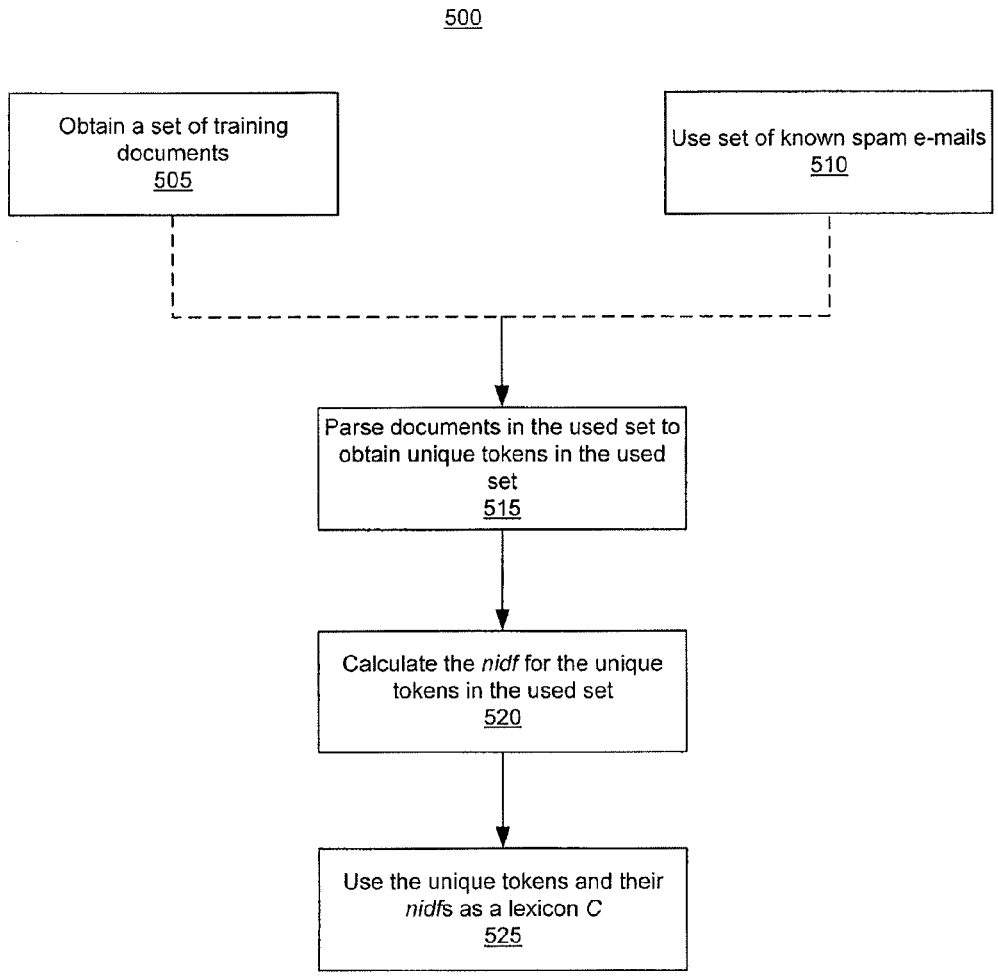
FIGS. 5-8 are flowcharts of exemplary implementations of actions 405, 415, 420 and 425, respectively, in FIG. 4 for an implementation of the process of FIG. 4 based on the I-Match approach.

Referring to FIG. 5, a process 500 is used to generate a primary lexicon L and a secondary lexicon B (action 405). In process 500, a set of documents are used to generate the lexicons. The set of documents may be a training set of documents, related or unrelated to spam e-mails, or the documents may be the set of known spam e-mails, or a combination of both. Even if a large diverse collection of training documents unrelated to spam e-mail is used to generate the lexicons, the lexicons may still be capable of being used to detect duplicates in the spam e-mails. In other words, lexicons generated from a large and diverse set of documents are capable of being used not only to detect duplicates of those documents in the collection, but also documents in different collections. For example, an experiment involved the use of a lexicon created from a corpus of 1.6 million different web pages (which were previously used in the I-Match experiments described in Chowdhury). These lexicons were used in an implementation of process 400 similar to that depicted in FIGS. 5-8, and performed well. This experiment is described in greater detail in U.S. Provisional Patent Application Ser. No. 60/543,283, filed on Feb. 11, 2004.

The ability to use a training collection that can be applied to detect documents in different collections may be useful in the context of spam filtering because the content distribution of spam is constantly changing (i.e., the content or topics of spam are constantly changing). The ability to use a training collection for different documents means that the lexicon(s) do not need to be constantly updated as spam changes, rather, as long as the signatures for the new spam e-mails are calculated and used, e-mail filter 232 should continue to operate well even as the content of spam changes.

Accordingly, in process 500, a set of training documents (related to or unrelated to spam e-mail) is obtained (505), the set of known spam e-mails is used instead (510), or a combination of the two is used to generate the lexicons. To do so, the set of documents used is parsed to obtain the unique tokens in the set of documents (515). Next, the nidf of the unique tokens in the set is calculated (520) according to:

$$NIDF_i = \frac{IDF_i}{\max IDF}, IDF_i = \log\frac{N}{n_i}$$

where N is the total number of documents in the set, $n_i$ is the number of documents in the set that contain token i, and max IDF is the maximum IDF value for the unique tokens. Thus, for example, to calculate the nidf for a particular token, e-mail filter 232 may initially calculate the IDF for all of the unique tokens and then divide the idf for the particular token by the maximum idf value.

Once the nidfs for the unique tokens in the set of documents are calculated, the unique tokens and their respective nidfs are used as a lexicon C. The tokens that have nidfs between a specified range are considered to be the primary lexicon L, while the tokens that have nidfs above the specified range are considered to be the secondary lexicon B. Generally, those tokens with mid-range nidfs are considered to be the ones that are most useful in identifying a particular document. In other words, those tokens that occur very frequently in the set and those that occur infrequently are generally not considered to be as useful in identifying a particular document. Accordingly, the range is generally specified to span those tokens with mid-range nidfs. The exact choice of the specified range is generally in the discretion of the system designer and may involve a degree of trial and error to determine the range that is most useful in a particular system. An exemplary range that may be suitable in some systems is the range of nidfs between 0.2 and 0.3. As such, the primary lexicon L in this case is considered to be those tokens with nidfs between 0.2 and 0.3, while the secondary lexicon B is considered to be those tokens with nidfs above 0.3.

Figure 6:
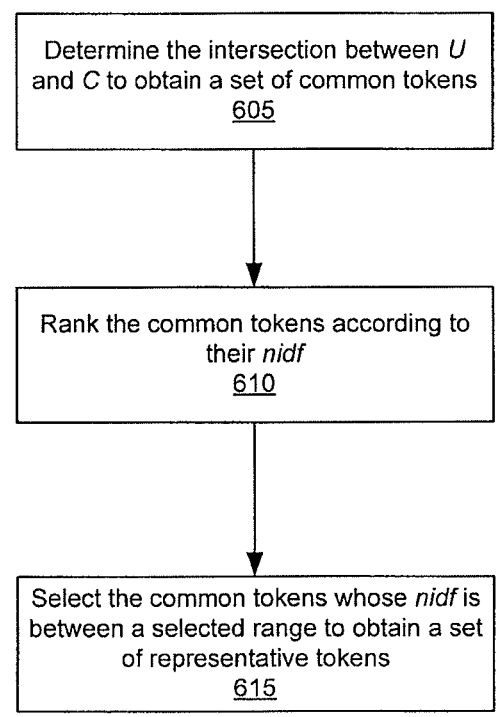

Referring to FIG. 6, a process 600 is used to determine the intersection between unique tokens U and the primary lexicon L (action 415). Prior to process 600, the unique tokens U in e-mail d are determined (410). A set of common tokens is obtained by determining the intersection between the unique tokens U and the lexicon C (i.e., e-mail filter 232 determines which tokens in U are also in the lexicon C and uses these as a set of common tokens) (605). The common tokens are then ranked according to their nidf (which was obtained from the nidfs contained in lexicon C, i.e., from the nidfs of the unique tokens in the set of documents) (610). The common tokens that have nidfs between the specified range that corresponds to the primary lexicon L are selected to obtain a set of intersection tokens, which are the intersection between the unique tokens U and the primary lexicon L.

Figure 7:
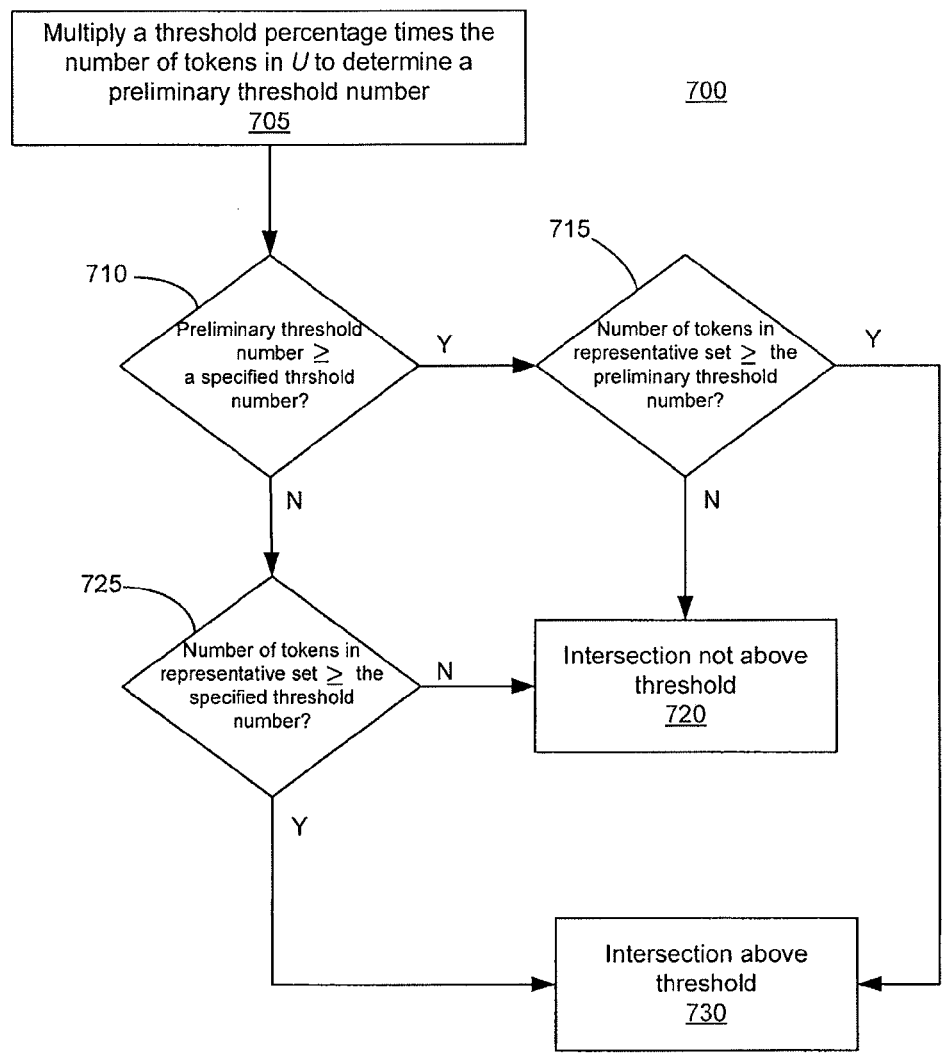

Referring to FIG. 7, a process 700 is used to determine if the intersection between the unique tokens U and lexicon L is above the threshold (action 420). In process 700, both a threshold number of tokens and a threshold proportion of unique tokens are used. Specifically, the intersection between the unique tokens U and the primary lexicon L (i.e., the set of intersection tokens) must contain at least a threshold number of tokens (e.g., 5 tokens) or must be at least a threshold proportion or percentage (e.g., 10%) of the unique tokens U, whichever is greater.

The threshold percentage or proportion is multiplied times the number of unique tokens U to determine a preliminary threshold number (705). If the preliminary threshold is greater than or equal to the specified threshold number (710), then a comparison is made between the number of intersection tokens and the preliminary threshold number to determine whether the number of tokens in the intersection set is greater than or equal to the preliminary threshold number (715). If so, then the intersection is above the threshold (730). If not, then the intersection is not above the threshold (720).

If the preliminary threshold is greater than or equal to the specified threshold number (710), then a comparison is made between the number of intersection tokens and the specified threshold number to determine if the number of intersection tokens is greater than or equal to the specified threshold number (725). If so, then the intersection is above the threshold (730). If not, then the intersection is not above the threshold (720).

The following is an example of process 700 applied to a first set of unique tokens U with 100 tokens, and a second one with 40 tokens when the specified threshold number is 5 and the specified threshold percentage is 10%. For the first set, 10% is multiplied times 100 to obtain a preliminary threshold number of 10 tokens (705). In this case, the preliminary threshold number (i.e., 10) is greater than the specified threshold number (i.e., 5) (710). Thus, for an intersection containing less than 10 tokens (715) the threshold is not met (720), while the threshold is met (730) for an intersection containing 10 or more tokens.

In contrast, for the second set, the preliminary threshold number is less than the specified threshold number (710) (i.e., 10%×40=4, which is less than the specified threshold number 5). Accordingly, the threshold is not met (720) for an intersection that contains less than 5 tokens, but the threshold is met (730) for an intersection with 5 or more tokens.

Figure 8:
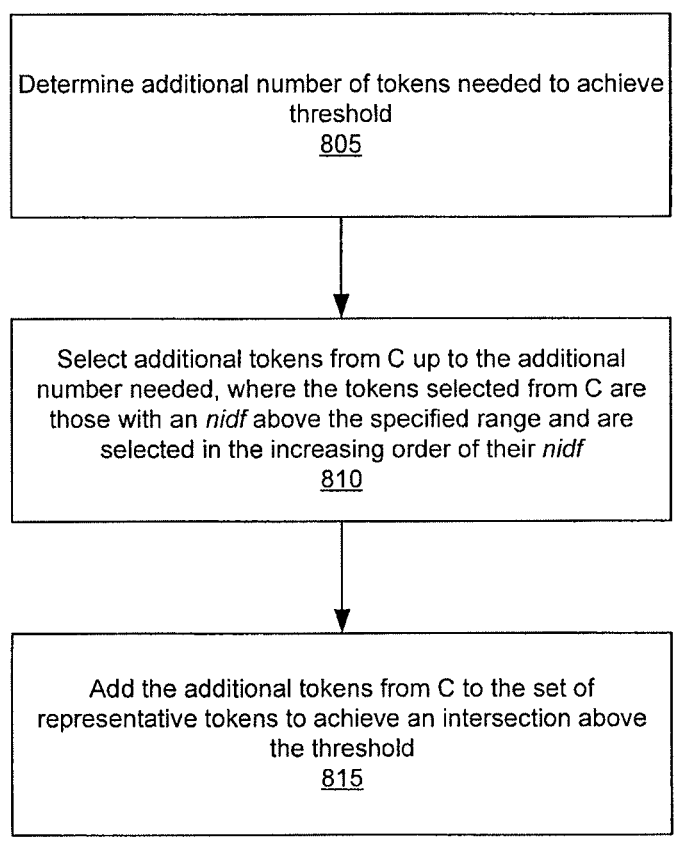

Referring to FIG. 8, a process 800 is used to add tokens from the secondary lexicon B to the intersection to achieve the threshold (action 425). Based on process 700, the additional number of tokens need to achieve the threshold is determined (805). This can be determined, for example, by taking the difference between number of tokens in the intersection set and the preliminary threshold number or the specified threshold number, depending on the situation that resulted in the threshold not being met. For instance, following the example above, for the first set of unique tokens U that contains 100 tokens, the difference between the number of tokens in the intersection set and the preliminary threshold number is calculated, while the difference between the number of tokens in the intersection set and the specified threshold number is calculated for the second set that contains 40 tokens.

Next, additional tokens from lexicon C are selected (810). The additional tokens selected equal the additional number to achieve the threshold and are selected from the tokens that are considered to be part of lexicon B, i.e., have an nidf above the specified range (e.g., tokens with an nidf greater than 0.3 when a specified range of 0.2 to 0.3 is used). The additional tokens also may be selected in rank order from the lowest nidf in the portion above the specified range to the highest nidf in the portion above the specified range. The tokens may be selected in this order to help insure that the additional tokens have similar nidf characteristics to the ones used from the primary lexicon L and, therefore, are more useful in identifying a particular document. As an example, if two tokens where needed to achieve the threshold, and three tokens have nidfs in range considered to be the secondary lexicon B, then the two tokens with the lowest nidf would be selected.

The additional tokens are then added to the set of intersection tokens to achieve an intersection that is above the threshold (815).

When process 400 is implemented based on an I-Match approach, the set of intersection tokens (which is the intersection) then is used to calculate the signature for the e-mail d (430). To do so, a hash algorithm that maps the set of intersection tokens to a single hash value may be used, where the single hash value is the signature for the e-mail d. For example, the SHA1 algorithm as described and implemented in Chowdhury may be used. The hash value is then stored as a spam signature or used as a query signature, depending on whether process 400 is implementing action 310 or 320.

The above-described techniques also may be used as an integrated system of spam filtering. For example, the duplicate detection techniques may be used to quickly identify and eliminate near-duplicates of spam e-mail at the entry point of an e-mail system. The e-mails that are not identified as spam based on duplicate detection may then be classified using, for instance, machine learning techniques. To that end, the e-mails may be provided to a naïve Bayesian classifier or a Support Vector Machine (SVM) based classifier, for instance, which then evaluates the e-mail content and classifies the e-mail as spam or non-spam. Thus, in the system of FIG. 2, for example, mail handler 234 may forward the e-mail that is indicated as not being spam to a classifier for classification as spam or non-spam.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (e.g., CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, in some places in the foregoing description an action is described as performed on each e-mail in a group (e.g., a spam signature is obtained for each e-mail in the set of known spam e-mails); however, the performance of the actions on each e-mail is not necessarily required. For instance, with respect to spam signatures, a spam signature may not be obtained for each known spam e-mail because of certain restrictions placed on signatures, such as the requirement that the intersection be above a threshold before a signature is generated. Thus, if an augmented intersection above a certain threshold can not be obtained for a particular spam e-mail, then the e-mail may be ignored and a signature not generated for it. Similarly, there may be restrictions on the number of unique tokens required. For instance, a spam e-mail may be required to contain a minimum number of unique tokens (e.g., 5) before it is used.

Additionally, in other implementations where the foregoing techniques are applied to spam filtering in other messaging media or other areas of duplicate detection, the attributes may be other features of the particular items being classified.

For instance, the attributes may be n-grams, image features, sound features, or features extracted from other forms of media.

Accordingly, implementations other than those specifically described are within the scope of the following claims.

What is claimed is:

1. A method comprising:
   generating, using at least one processor, a primary lexicon of attributes and a secondary lexicon of attributes;
   determining unique attributes in a document;
   determining an intersection between the unique attributes in the document and the primary lexicon;
   determining the intersection is below a predetermined threshold;
   based on the intersection being below the predetermined threshold, applying the secondary lexicon to augment the intersection; and
   calculating a set of identifiers for the document based on the augmented intersection.

2. The method of claim 1, further comprising forwarding the document based on the augmented intersection exceeding the predetermined threshold.

3. The method of claim 2, further comprising enabling a user to select the predetermined threshold.

4. The method of claim 1, further comprising receiving a plurality of known spam documents.

5. The method of claim 4, further comprising:
   analyzing each of the plurality of known spam documents; and
   determining a plurality of unique attributes for each of the known spam documents.

6. The method of claim 5, wherein the plurality of unique attributes comprise one or more of textual identifiers, hypertext markup language identifiers, or non-textual identifiers.

7. The method of claim 6, wherein textual identifiers are words, phrases or clusters of words.

8. The method of claim 1, further comprising determining that the document is a duplicate of another document stored in a search engine database.

9. The method of claim 1, further comprising preventing the document from being returned to a user as part of search results provided by a search engine.

10. The method of claim 9, wherein the search engine comprises an Internet search engine.

11. The method of claim 1, further comprising determining that the document is a duplicate of another document provided by a newsfeed application.

12. The method of claim 11, wherein the document comprises a news story.

13. A system comprising:
    at least one processor; and
    at least one non-transitory computer readable medium storing instructions thereon that, when executed by the at least one processor, cause the system to:
      generate a primary lexicon of attributes and a secondary lexicon of attributes;
      determine unique attributes in a document;
      determine an intersection between the unique attributes in the document and the primary lexicon;
      determine that the intersection is below a predetermined threshold;
      based on the intersection being below the predetermined threshold, apply the secondary lexicon to augment the intersection; and
      calculate a set of identifiers for the document based on the augmented intersection.

14. The system of claim 13, further comprising instructions that, when executed by the at least one processor, cause the system to forward the document based on the augmented intersection exceeding the predetermined threshold.

15. The system of claim 14, further comprising instructions that, when executed by the at least one processor, cause the system to enable a user to select the predetermined threshold.

16. The system of claim 13, further comprising instructions that, when executed by the at least one processor, cause the system:
    receive a plurality of secondary documents with a known specific identity;
    analyze the plurality of secondary documents; and
    determine one or more attributes from each of the plurality of secondary documents that are indicative of the known specific identity.

17. The system of claim 13, further comprising instructions that, when executed by the at least one processor, cause the system to determine that a duplicate document is stored in a search engine document by searching the search engine database for the unique attributes of the document.

18. The system of claim 13, further comprising instructions that, when executed by the at least one processor, cause the system to determine that a duplicate document is provided by a newsfeed application, by searching newsfeed applications for the unique attributes of the document.

19. The system of claim 18, wherein the document comprises a news story.

20. The system of claim 19, further comprising instructions that, when executed by the at least one processor, cause the system to eliminate one or more search engines results that are duplicates of the document, based on a comparison of the unique attributes of the document to the unique attributes of each of the one or more search engine results.

* * * * *